(12) United States Patent
Widdison

(10) Patent No.: US 8,453,890 B2
(45) Date of Patent: Jun. 4, 2013

(54) PRODUCT CONTAINER

(75) Inventor: Leon Widdison, Laufen (DE)

(73) Assignee: WIBERG Besitz GmbH, Salzburg (AT)

( * ) Notice: Subject to any disclaimer, the term of this patent is extended or adjusted under 35 U.S.C. 154(b) by 153 days.

(21) Appl. No.: 13/135,828

(22) Filed: Jul. 15, 2011

(65) Prior Publication Data

US 2012/0018438 A1   Jan. 26, 2012

(30) Foreign Application Priority Data

Jul. 20, 2010   (EP) ..................................... 10007502

(51) Int. Cl.
*B65H 3/00*   (2006.01)

(52) U.S. Cl.
USPC ........... 222/536; 222/154; 222/531; 222/533; 222/537; 222/557; 222/566; 221/255

(58) Field of Classification Search
USPC .................. 222/460, 461, 502, 503, 526–539, 222/544–547, 556–562, 566, 567, 569, 154, 222/156–159; 221/155, 255, 256
See application file for complete search history.

(56) References Cited

U.S. PATENT DOCUMENTS

| | | | |
|---|---|---|---|
| 918,875 A * | 4/1909 | Lore | 222/514 |
| 2,089,509 A * | 8/1937 | Taylor | 222/531 |
| 2,921,720 A * | 1/1960 | Malachick | 222/154 |
| 3,094,244 A * | 6/1963 | White | 222/23 |
| 4,216,880 A | 8/1980 | Drelichowski | |
| 6,257,449 B1 | 7/2001 | Baerenwald | |
| 7,500,622 B2 | 3/2009 | Golding et al. | |
| 2003/0192905 A1* | 10/2003 | Spivey | 221/255 |
| 2009/0072055 A1* | 3/2009 | Flanagan-Kent et al. | 239/664 |

FOREIGN PATENT DOCUMENTS

| | | |
|---|---|---|
| DE | 849 829 | 9/1952 |
| DE | 17 62 658 | 3/1958 |
| DE | 30 04 292 | 8/1981 |
| DE | 295 01 666 | 5/1996 |
| DE | 296 07 073 | 8/1997 |
| DE | 202 06 224 | 8/2003 |
| DE | 203 15 168 | 2/2005 |
| WO | WO 2004/026714 | 4/2004 |

* cited by examiner

*Primary Examiner* — J. Casimer Jacyna
(74) *Attorney, Agent, or Firm* — Collard & Roe, P.C.

(57) ABSTRACT

The product container, in particular for spices, is made of opaque material, wherein one wall (2) of the container (1) comprises a viewing window (3) made of transparent material. A dispenser (6) which is secured pivotably on a pivot axis (7) between two limit positions, is shaped and dimensioned so that in one limit position it completely covers the viewing window (3) and in the other limit position completely exposes the viewing window (3). The dispenser (6) is connected in a non-rotatable manner to an closing flap (8), which is pivoted at the same time as the dispenser (6) and closes an outlet opening (5) in one limit position and releases it in the other limit position.

7 Claims, 6 Drawing Sheets

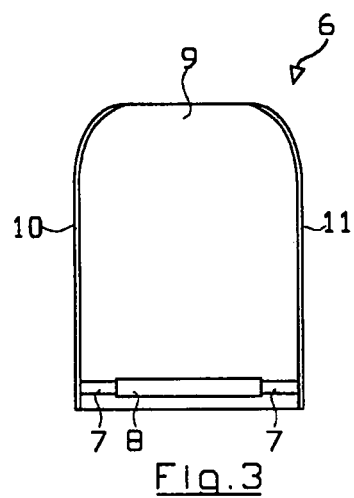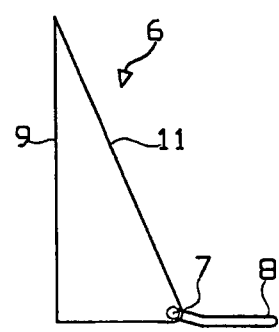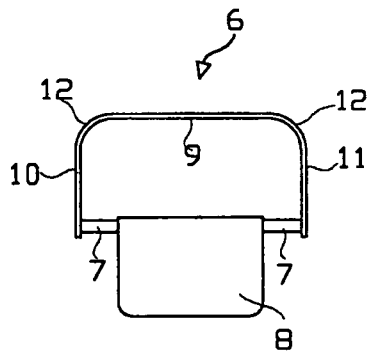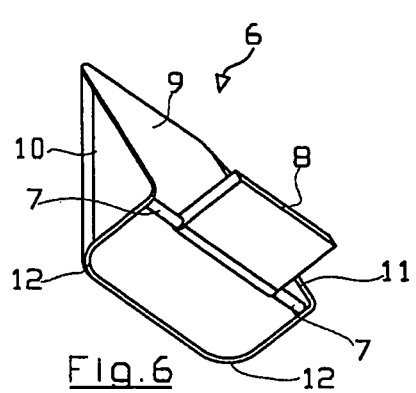

PRODUCT CONTAINER

CROSS REFERENCE TO RELATED APPLICATIONS

Applicant claims priority under 35 U.S.C.§119 of European Application No. 10 007 502.7 filed on Jul. 20, 2010, the disclosure of which is incorporated by reference.

The invention relates to a product container. A product container of this kind is known from DE 202 06 224 U1. Said product container has a lid with a recess which can be closed by a cover which is in the shape of a dispensing device, wherein the dispensing device is joined to the lid by a pivot axis in the form of a hinge, material thinning or film hinge and thereby can be pivoted between a first limit position, in which the recess is closed and a second limit position in which the recess is open.

The container is preferably made from a plastic material and is primarily intended for the storage of pourable foodstuffs.

Similar openable and reclosable product containers are also known from DE 295 01 666 U1, DE 296 07 073 U1, DE 203 15 168 U1, DE 1762658 U1, DE 3004292 A1, DE 849829, WO 2004/026714 A1, U.S. Pat. Nos. 6,257,449 B1 and 4,216,880 A.

In general it is desirable in the case of product containers to be able to see the contents of closed containers, which is why containers are often made of transparent glass. However, it is also necessary to protect specific products, in particular spices, from incidental light so that they retain their quality. For this reason product containers for spices are mostly made from opaque materials and are characterized by written labeling of the contents on the container. However, this labeling is often difficult to read or even illegible because of dirt created by use in the kitchen. Also the filling level of the container cannot be determined visually.

The objective of the invention is to improve a product container of the aforementioned type, such that on the one hand its contents are protected from the effects of light and on the other hand its contents can be checked visually from the outside.

Said objective is achieved by way of the features in accordance with the invention. Advantageous designs and developments of the invention are discussed below.

The basic concept of the invention is that the container made of opaque material has a viewing window, which in the closed position is completely covered by the pivotable dispenser and which in the open position of the dispenser, and even in partly open positions of the dispenser, exposes the viewing window. In the closed position the dispenser grips over the container partly and covers the viewing window completely with a front wall. In the open position the dispenser is arranged at the (outlet) opening and performs its actual function as a dispenser. To fully close and open the opening the dispenser is connected in a non-rotatable manner to a closing flap which is pivoted together with the dispenser and opens or closes the opening. The closing flap is connected by the pivot axis to the dispenser. The sealing flap projects into the inside of the container and is arranged to be essentially perpendicular to the front wall of the dispenser.

Preferably, the lid of the product container has a bearing shell for mounting the pivot axis.

In a particularly simple manner, the pivot axis of the dispenser and the closing flap is secured between the bearing shell of the lid and the edges of the container.

Preferably, the dispenser, the pivot axis and the closing flap are made of plastic in one piece in particular in an injection mold or are made of metal.

According to one embodiment of the invention part bearing shells can be attached to the edges of the container for supporting the pivot axis.

Preferably, a wall of the lid pointing into the inside of the container is used as a limit stop for the pivoting movement of the closing flap and thereby at the same time also as the limit stop of the pivot movement of the dispenser.

The invention is explained in more detail in the following with reference to exemplary embodiments in association with the drawings.

FIGS. 3-5 show different side views of the dispenser used for the product container;

FIG. 6 shows a perspective view of the dispenser of FIGS. 3-5;

Figures 1, 2:
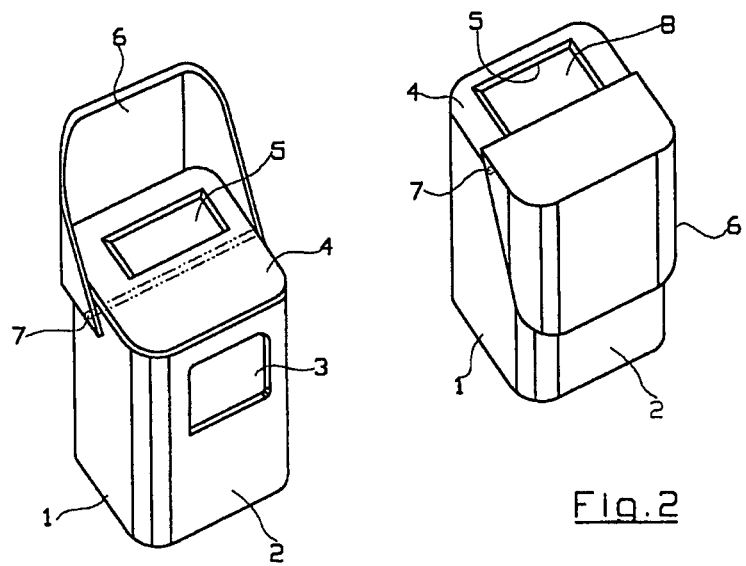
FIG. 1 shows a perspective view of the product container in the opened position.
FIG. 2 shows a perspective view of the product container in the closed position.

FIG. 1 shows the product container according to the invention in the open position. The product container here comprises a cuboid-shaped container 1 made of opaque material and on one side wall 2 has a viewing window 3 made of transparent material. The container 1 is partly closed by a lid 4, and said lid 4 comprises an opening 5 through which the contents of the container 1 can be removed. The lid 4 mounts a pivotable dispenser 6, the pivot axis 7 of which is secured between the lid 4 and an upper edge of the container 1. The pivot axis 7 runs parallel to a plane of the viewing window 3. The pivot axis 7 is arranged centrally on the upper edge of corresponding side walls of the container 1. On the pivot axis 7 a closing flap 8 is attached, which is connected rigidly and in particular non-rotatably to the pivot axis 7. Preferably, the dispenser 6, the pivot axis 7 and the closing flap 8 are injection molded in one piece from plastic.

In the opened position in FIG. 1 the closing flap 8 releases the opening 5 and the dispenser 6 exposes the viewing window 3.

In the closed position, shown in FIG. 2, the opening 5 is closed by the closing flap 8 and the dispenser 6 covers the viewing window 3 completely. The dispenser 6 including the closing flap 8 is made of an opaque material, so that in the closed state of the product container its contents are closed off from the light.

FIGS. 3 to 6 show the dispenser 6 with pivot axis 7 and closing flap 8 in three side views (FIGS. 3 to 5) and in perspective view (FIG. 6). The dispenser 6 has a front wall 9 and two side walls 10 and 11 projecting perpendicularly therefrom, which in side view (FIG. 4) have approximately the shape of a right-angled triangle. The side walls 10 and 11 are joined by a curve 12 to the front wall 9. Points of the side walls 10 and 11 facing away from the front wall 9 are joined together by the pivot axis 7, wherein the pivot axis 7 is joined in a non-rotatable manner to the side walls 10 and 11.

The closing flap 8 is secured to the pivot axis 7 also in a non-rotatable manner. The closing flap 8 is rectangular in plan view (FIG. 5), and its dimensions are such that it completely covers the opening 5 (FIG. 1).

The closing flap 8 is attached onto the rotational axis 7, so that it points approximately at a right angle from the front wall 9. The width of the closing flap 8 is smaller than the distance between the two side walls 10 and 11, so that on both sides of the closing flap 8 sections of the rotational axis 7 are freely accessible.

Figure 7:
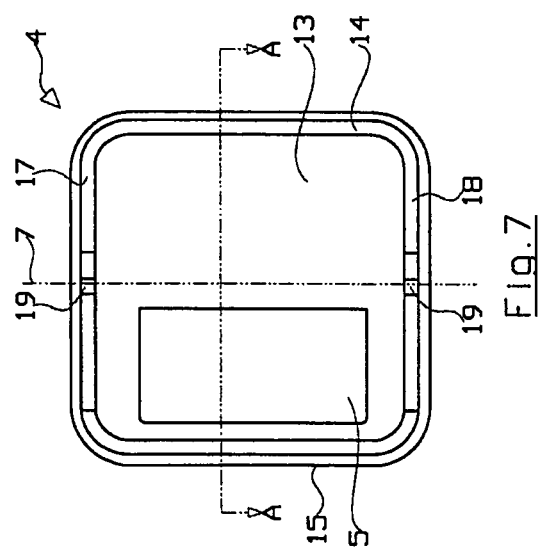
FIG. 7 shows a view of the inside of the lid used for the product container.
Figure 8:
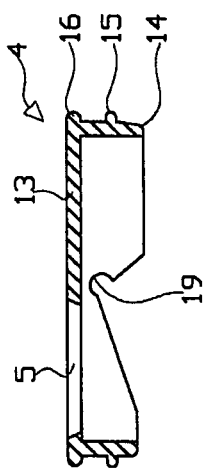
FIG. 8 shows a cross section along line A-A of FIG. 7.
Figure 9:
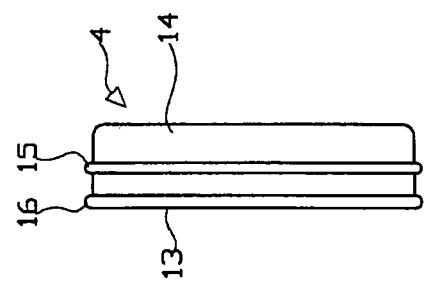
FIG. 9 shows a side view of the lid of FIG. 7.

FIGS. 7, 8 and 9 show the lid 4 in plan view (FIG. 7), in a cross sectional first side view (FIG. 8 shows a cross section along line A-A of FIG. 7) and in a second side view (FIG. 9).

The lid 4 has an essentially flat upper wall 13, from which an annular insertion edge 14 projects, which is adjusted to the shape of the container 1. In the upper wall 13 the opening 5 is recessed. The insertion wall 14 and the upper wall 13 respectively have a laterally projecting clamping beading 15 or 16, by means of which the lid 4 can be clamped securely onto the container 1 (cf. in particular FIG. 10). On the container 1 an inwardly projecting beading 22 is provided, which engages between two clamping beads 15, 16, whereby the lid 4 is firmly secured to the container 1, which is explained in more detail below.

On two opposite walls 17 and 18 of the insertion edge 14 respectively a circular segment-like recess 19 is provided, which is used as a bearing shell for the pivot axis 7. Said recess 19 is partly open in the direction of the free end of the insertion edge 14, so that the pivot axis 7 can be used easily. As in the following description the pivot axis 7 is thus fixed clearly by the recess 19 and the upper edge of the container 1.

Figure 10:
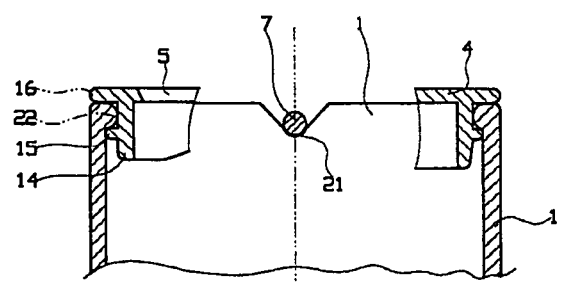
FIG. 10 shows a cross section of part of the container with a fitted on lid but without a dispenser.

FIG. 10 shows a partly cropped side view of the container 1 with a fitted lid 4 and the pivot axis 7 according to one variant of the invention, in which at the upper edge of two opposite side walls 17 and 18 (in FIG. 7) of the container 1 a recess is provided, which has a circular segment-shaped base, which forms part of a bearing shell 21 for the pivot axis 7.

Furthermore, in this drawing beading 22 is shown on the upper container edge, which engages between the clamping beads 15 and 16 of the lid 4 and thereby fixes the lid 4 onto the container 1. Of course, the lid 4 and/or the container 1 are made of elastic material, so that the lid 4 can be inserted into the container 1.

Figure 11:
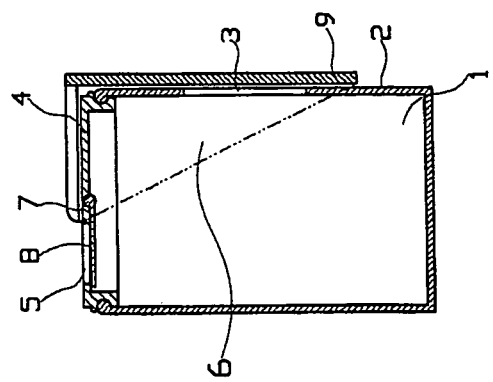
FIGS. 11-13 show schematic cross-sectional views of the product container in the closed position, intermediate position and opening position.
Figure 12:
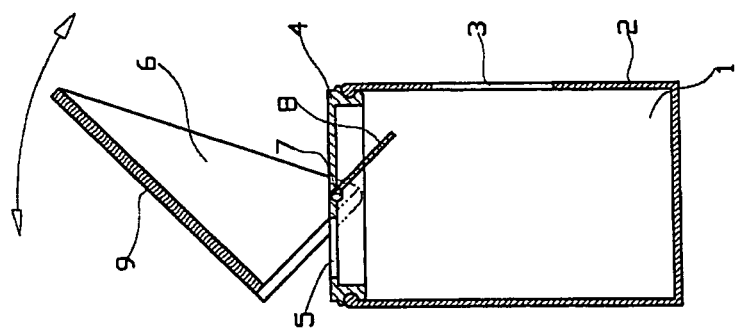
Figure 13:
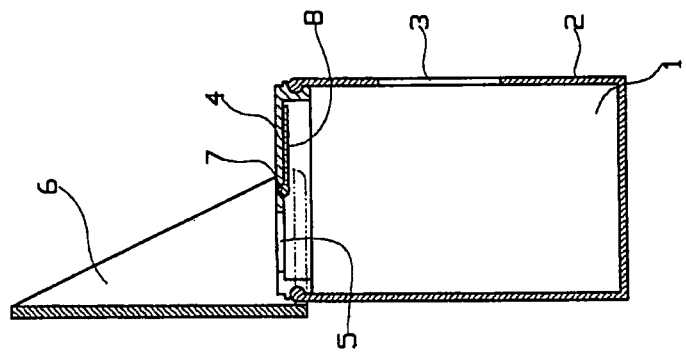

FIGS. 11 to 13 show schematic cross sectional views of the spice dispenser in a closed position (FIG. 11), in a partly opened position (FIG. 12) and in a completely opened position (FIG. 13).

In the closed position the front wall 9 of the dispenser 6 lies against the side wall 2 of the container 1 and completely covers the viewing window 3. At the same time the closing flap 8 lies against the inner surface of the lid 3 and completely closes the opening 5.

In FIG. 12 the dispenser 6 is pivoted in the direction of the arrow about the pivot axis 7, whereby the closing flap 8 is also pivoted at the same time and exposes the opening 5.

In the opening position of FIG. 13 the dispenser 6 is aligned to be essentially vertical and the closing flap 8 lies against the inner wall of the lid 4, which thereby also forms a limit stop. The dispenser 6 joins onto the opening 5 so that on tilting the container 1 its contents drop into the dispenser 6 and can be removed in a controlled manner. The viewing window 3 is no longer covered in the positions of FIGS. 12 and 13, so that the contents of the container can be seen through the viewing window 3.

Figure 14:
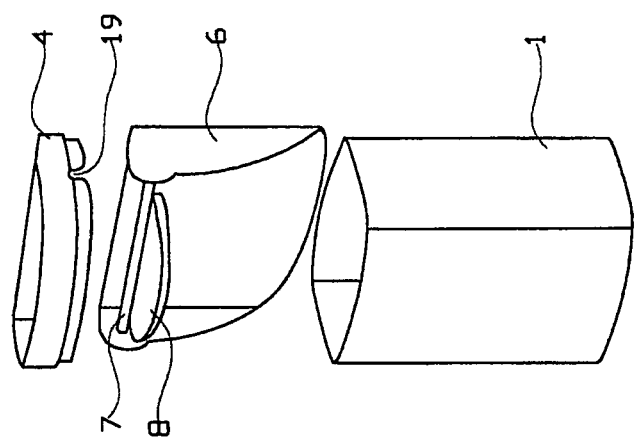
FIG. 14 shows an explosive view of the product container.

FIG. 14 illustrates the simple assembly of the dispenser 6 by the lid 4, which with its bearing shells 19 fixes the pivot axis 7 and thereby also the dispenser 6 with the closing flap 8 onto the container 1.

The invention claimed is:

1. A product container comprising
   (a) a container comprising an inner chamber having an opening to the inner chamber and a first wall comprising a viewing window made of a transparent material, said container being made of an opaque material;
   (b) a lid;
   (c) a closing flap; and
   (d) a dispenser nonrotatably connected to the closing flap and comprising a front wall perpendicular to the closing flap, said dispenser being pivotable about a pivot axis between a first limit position wherein the closing flap completely closes the opening and a second limit position wherein the closing flap completely opens the opening;
   wherein the dispenser is shaped and dimensioned so that in the first limit position the dispenser completely covers the viewing window and in the second limit position the dispenser completely exposes the viewing window.

2. The product container as claimed in claim 1, wherein the lid comprises a bearing shell for mounting the pivot axis.

3. The product container as claimed in claim 2, wherein the dispenser is secured between the bearing shell of the lid and edges of the container.

4. The product container as claimed in claim 1, wherein the dispenser, the pivot axis and the closing flap are made of plastic in one piece.

5. The product container as claimed in claim 3, further comprising part bearing shells attached to the edges of the container for mounting the pivot axis.

6. The product container as claimed in claim 1, wherein the lid comprises a wall forming a limit stop for stopping pivotal movement of the closing flap and of the dispenser.

7. The product container as claimed in claim 1, wherein the dispenser further first and second side walls projecting at right angles from the front wall, wherein the side walls are triangular in side view and the pivot axis is attached to points of the side walls facing away from the front wall.

\* \* \* \* \*